R. A. GIBSON & J. B. SARTOLOU.

MUSIC LEAF TURNER.

APPLICATION FILED APR. 23, 1912.

Reissued Aug. 18, 1914.

13,789.

2 SHEETS—SHEET 1.

Witnesses.
Thos. Lostberg.
A. S. Berry.

Inventors
Robert H. Gibson.
John B. Sartolou.
by G. H. Strong.
Their Atty.

R. A. GIBSON & J. B. SARTOLOU.
MUSIC LEAF TURNER.
APPLICATION FILED APR. 23, 1912.
Reissued Aug. 18, 1914.
13,789.
2 SHEETS—SHEET 2.
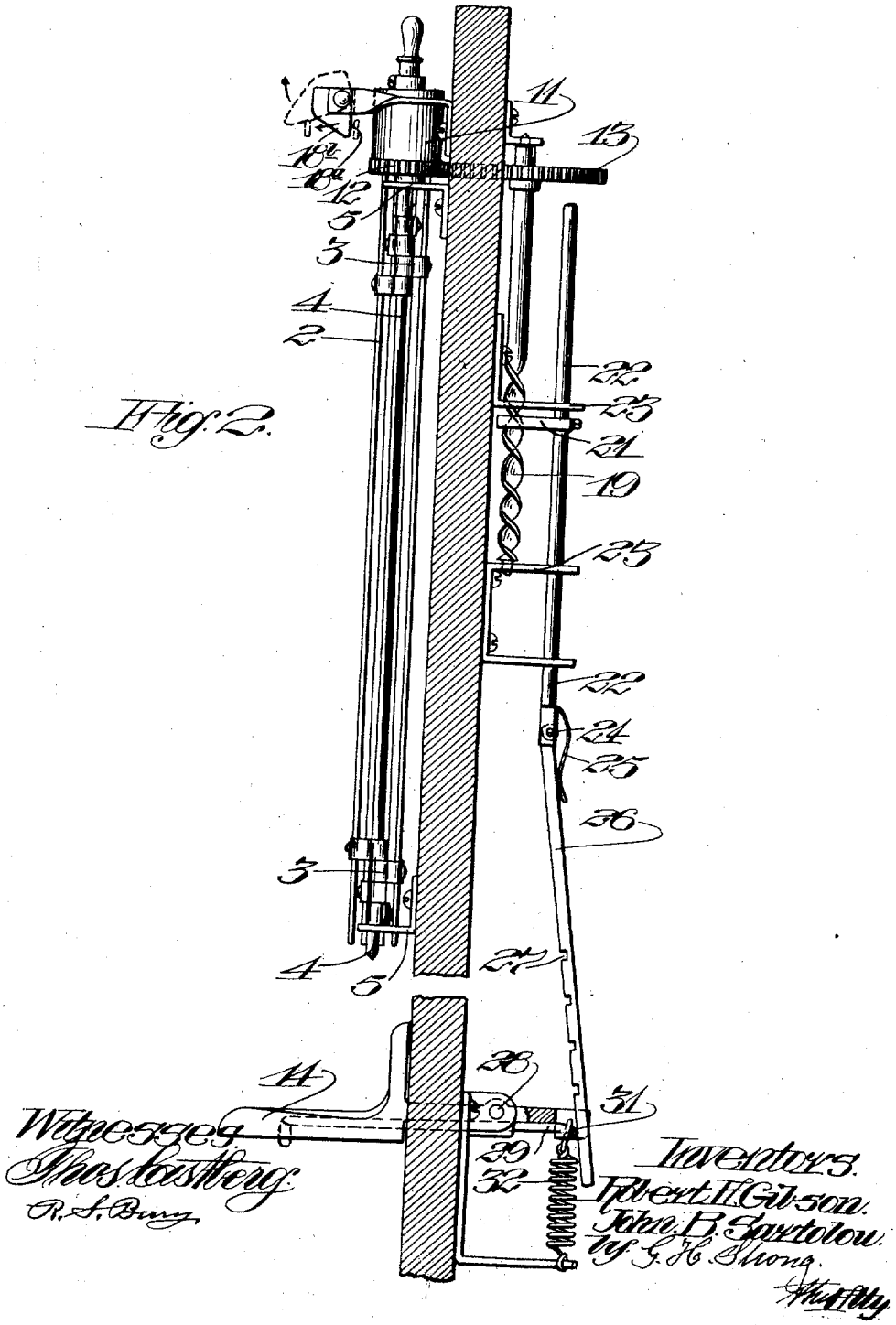

UNITED STATES PATENT OFFICE.

ROBERT A. GIBSON, OF BERKELEY, AND JOHN B. SARTOLOU, OF EMERYVILLE, CALIFORNIA, ASSIGNORS TO UNIVERSAL DISPLAY ADVERTISING COMPANY, OF OAKLAND, CALIFORNIA, A CORPORATION OF CALIFORNIA.

MUSIC-LEAF TURNER.

13,789. Specification of Reissued Letters Patent. Reissued Aug. 18, 1914.

Original No. 979,942, dated December 27, 1910, Serial No. 570,484. Application for reissue filed April 23, 1912. Serial No. 692,752.

*To all whom it may concern:*

Be it known that we, ROBERT A. GIBSON, a resident of Berkeley, Alameda county, California, and JOHN B. SARTOLOU, a resident of Emeryville, Alameda county, California, citizens of the United States, have invented new and useful Improvements in Music-Leaf Turners, of which the following is a specification.

This invention relates to music leaf turners.

The object of our invention is to devise and provide a neat, reliable and efficient mechanism adapted to be suitably connected to a piano or other instrument, or to be utilized as a music stand, *per se*.

It is a special object to make the mechanism with leaf turning elements readily reversible by the foot, so as to turn the leaves forward or backward automatically.

The invention consists of the parts and the construction and combination of parts as hereinafter more fully described and claimed, having reference to the accompanying drawings, in which—

Figure 1:
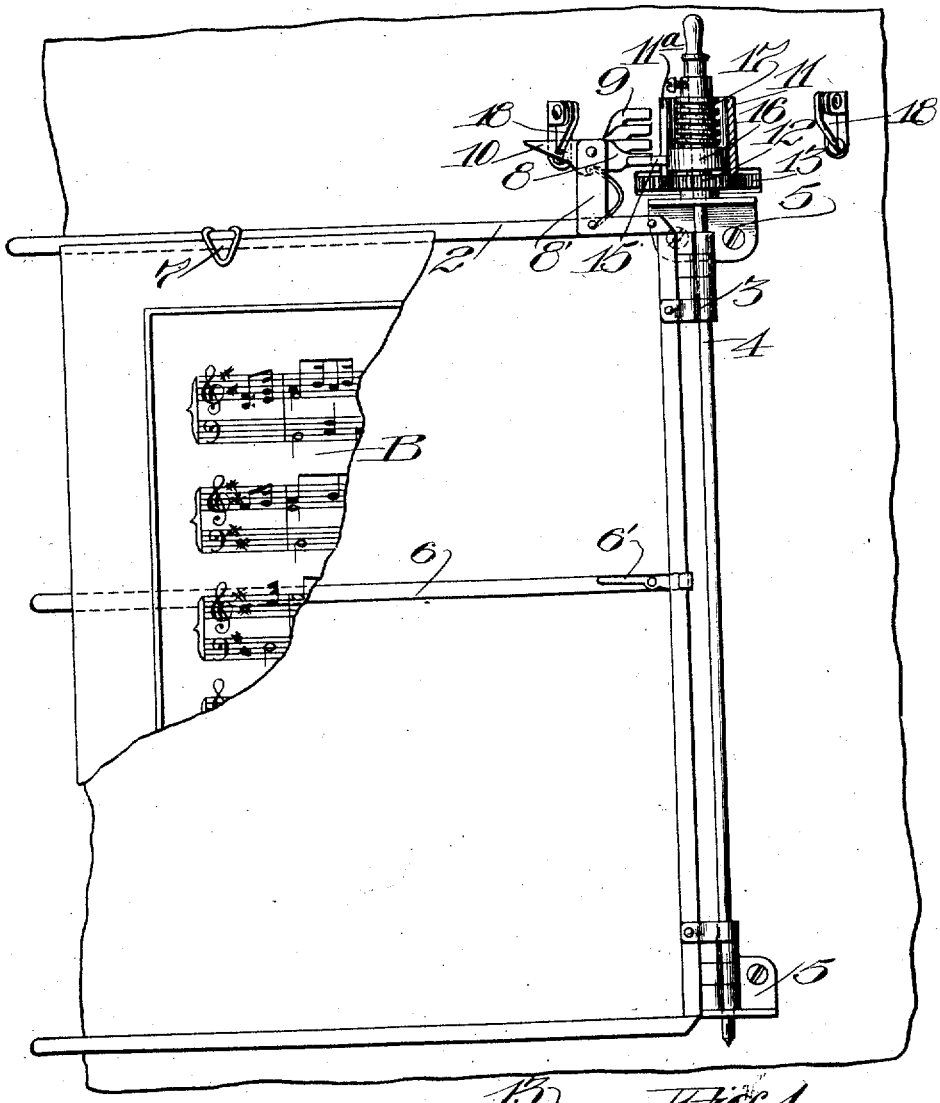
Figure 5:
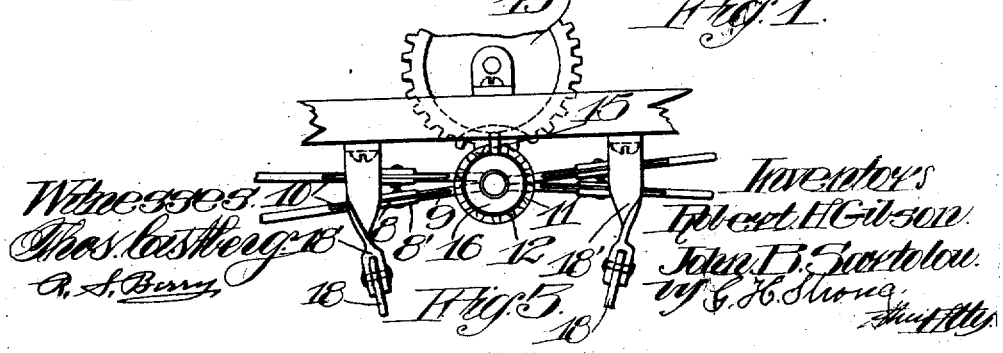

Figure 1 is a front view in partial section of the device as applied to a musical instrument. Fig. 2 is a side view of the device, showing a part of a piano case in section. Fig. 3 is a plan view.

The accompanying illustrations represent a device constructed and successfully operated, embodying leaf-carrying frames or wings 2 hinged by vertical sleeves 3 to swing about a spindle or post 4 which may be mounted in brackets 5 fastened to the piano. These wings are of suitable size, shape and material; preferably each is in practice made of a strip of metal bent to provide a vertical back portion with top and bottom arms, the back carrying the hinges 3 and each wing 2 being provided with an adjustable horizontal arm or back rest 6 and a suitable sheet clamp 7 for supporting the imposed music. The arm 6 is clamped to the back vertical piece of a wing 2 by suitable means as the cam lever 6′.

In order to successively turn each sheet automatically, we provide the following means: Each of the several wings 2 is provided with a spring-latch or strike lug 8, pivoted on a bracket 8′ on the wing; the latch has an inwardly extending spur 9 and an outwardly projecting arm 10, and the several spurs or projections 9 are arranged successively in different planes to be engaged successively by a vertically traveling arm or dog 15, as will be shortly described.

Independently revoluble around the upper end of the spindle 4 is a drum or barrel 11 having a gear 12 formed on or fixed to its lower end, and which meshes with a master gear 13 operated by suitable connections as will be later described from the pedal 14. The barrel 11 is slotted vertically at 11ª and guides the vertically traveling arm or dog 15 adapted to engage the above mentioned spurs 9 of the wings 2, successively. The arm or dog 15 is secured on a nut 16 operable along a stationary screw 17 fastened in the upper bracket 5, so that when the barrel is revolved the nut 16 is turned on the fixed screw 17, and made to rise or fall according to the direction of rotation. The several spurs 9 are shown in Fig. 1 as being in successive, different horizontal and vertical planes and thus when the barrel is first turned the nearest spur is encountered by the dog 15 and turned to the left one-half a revolution, or sufficient to turn a sheet of music represented at B. As the spur 9 nears the limit of its motion its outer arm 10 engages a pivoted cam 18 hung on a fixed bracket 18′, by which it is tilted on its pivot or tipped to release the actuating dog 15, which latter continues to move until it has completed a revolution. During this revolution the nut 16, if starting from the top of the barrel has descended on screw 17 so that the dog will be in such position as to encounter the next lower and successive spur 9 of leaf wing 2. The dog may be turned as many times to the left as there are leaves of music to be turned and then the leaves may be returned by reversing the direction of rotation of the barrel 11, which will cause the nut and dog to travel up the screw and successively engage and return the leaf wings 2. During the return movement of each spur 9 the cam 18 will freely lift to allow the spurs to pass, meanwhile the spurs will be tripped to release the dog by similar right-hand cam 18. There is a cam 18 on each side of the drum or barrel 11, as shown in Figs. 2 and 3. Each cam is preferably triangular, Fig. 1, with an inclined face 18[b] to trip a latch spur 10 and with a vertical face 18[c] tripped by the same spur 10 when a wing swings in the other direction.

An appropriate and simple mechanism for operating the master gear 13 from the foot comprises a twisted or helical shaft 19 carrying the gear 13 and engaged by a nut 21 secured to a vertically movable rod 22 guided in bearings 23 on the back of the leaf turner support.

A rod 26 is pivoted to the lower end of the rod 22 at 24, and is normally depressed by a spring 25. Rod 26 has a series of equally spaced, transverse square notches 27 on one edge engaged by a reversible pawl 29 operated by the pedal 14. The pedal 14, is pivoted at 28, and pawl 29 is mounted on the under side of the pedal in suitable bearings and has a curved broad end 31. This curved end 31 always rests against the back of the notched rod 26, and this end 31 is so turned up or down so that when the pedal is depressed the pawl engages one of the notches and lifts or pulls down rods 26—22 and nut 21, thus turning the master gear 13, one way or the other. The pedal is drawn back by a spring 32. The leaves of music are successively turned backward or forward each time the pedal is depressed, according to whether the pawl 29 is pointing up or down. If point 31 is turned up it engages the notches 27 successively to pull the rod down, and vice versa. The front end of the pawl 29 is provided with a lateral crank extension 30 by which the operator can easily reverse the pawl by his foot to make the point 31 stick upward or downward. The position of the parts in Fig. 2 shows all the wings 2 turned to the left and the pawl axially turned with its end 31 down, so that now if the pedal be depressed the pawl will rise and the lowest notch on rod 26, encountered, consequently the spring 32 will pull down the coupler 26 automatically, and its action will turn the sleeve 11 causing the dog 15 to turn to the right and swing back the lowermost spur 9. The reversing of the direction of rotation of gear 13 also reverses the motion of sleeve 11 and this results in moving the nut 16 upward on the fixed screw 17; therefore, the dog 15 will be elevated to register with the offset spurs 9.

It is manifest or possible that the construction herein specified may be varied without departing from the principle of the invention, and we desire it to be understood that the invention is not limited to any specific form or arrangement of parts, except in so far as such limitations or their mechanical equivalents are specified in the claims.

Having thus described our invention what we claim and desire to secure by Letters Patent is—

1. In a music leaf turner, the combination of a series of leaf holders, a suitable support for the same, selective means carried by the holders and disposed in successive levels, a rotating part having a vertical movement to position it successively with respect to said selective means, and means for operating said rotating part in either direction, said operating means including a rotatable drum inclosing the rotating part, said drum being slotted and said part having an actuating dog extending through the slot of the drum and thereby connecting the drum and rotating part so that they turn in unison.

2. In a music leaf turner, the combination of series of pivoted leaf holders, a suitable support for the same, selective means on each holder, the several selective means arranged in successive levels, a single actuator, with means for giving it a combined horizontal rotary motion, and a vertical reciprocating motion to operate said selective means successively, and means for operating said actuator, said last named means including a pedal and connections including a reversible pawl and gearing between the pedal and said actuator whereby the actuator is operated in either direction.

3. In a music leaf turner, the combination of a series of music leaf holders, a suitable support for the same, a vertically slotted drum, means for revolving the drum, a stationary screw, a single vertically traveling actuator on the screw and connected with the drum, means on the several leaf holders arranged at successive levels in the path of said actuator, and means for revolving the drum in either direction.

4. In a music leaf turner, the combination of a series of music leaf holders, a suitable support for the same, a vertically slotted drum, a fixed vertical screw, a single vertically traveling actuator on the screw and connected with the drum, means on the several leaf holders arranged at successive levels in the path of said actuator, and means for turning the holders in either direction corresponding with the rotation of the drum.

5. In a music leaf turner, the combination of a plurality of swinging leaf-carrying frames, a spindle supporting said frames, a vertically slotted drum revoluble around said spindle, an arm extending through and guided by said drum, and means carried by the slot in the frames adapted to be engaged by said arm and automatically disengaged therefrom, whereby the leaves of music are turned.

6. In a music leaf turner, the combination of a plurality of swinging leaf-carrying frames, a spindle supporting said frames, a vertically slotted drum revoluble around said spindle, an arm extending through and guided by said drum, and means carried by the slot in the frames adapted to be engaged by said arm and automatically disengaged therefrom, whereby the leaves of music are turned in either direction.

7. In a leaf-turning device, the combination of a spindle, frames pivoted thereon, pivotally mounted stops on the frames, a vertically slotted drum turnable on the spindle, a dog turnable about the spindle having a part extending through the slot of the drum and adapted to successively engage the stops, and means whereby the stops are automatically released to allow the dog to pass.

8. The combination in a music leaf turner, of a number of leaf holding frames, a support about which they may swing back and forth, a vertically slotted drum turnable on the support, and carrying a dog having a part extending through the slot of the drum and engageable successively with the frames, and means whereby the drum may be intermittently turned, in either direction.

9. In a music leaf turner, the combination of a series of pivoted leaf holders, a suitable support for the same, selective means of the holders arranged in different horizontal planes, a vertically slotted drum mounted rotatably about a vertical axis, vertically traveling actuator within the drum having a part extending through the slot thereof and engageable with the selective means successively, and means for operating the drum in either direction.

10. In a music leaf turner, the combination of a series of pivoted leaf holders, a suitable support for the same, selective means for the holders arranged in different horizontal planes, a slotted drum mounted rotatably about a vertical axis, vertically traveling actuator within the drum having a part engageable with the selective means successively, said drum having a gear, a master gear meshing with said gear on the drum, a worm shaft carrying the master gear, a reciprocating member having a traveling nut engaging the worm on said shaft to turn the master gear, and means for operating said reciprocating member step by step in either direction.

11. An apparatus of the class specified comprising devices for swingingly supporting a plurality of display cards, and means for swinging said devices including an actuator supported for rotary and axial movements and strike lugs each connected with a respective device, said strike lugs being spaced to be successively engaged by said actuator during its axial movement.

12. An apparatus of the class specified comprising devices supporting a plurality of display cards for movement, means for moving said devices successively in relatively opposite directions comprising an actuator supported for rotary and axial movements, and strike lugs each connected with a respective device, said strike lugs being spaced to be successively engaged by said actuator during its axial movement.

In witness whereof we have hereunto set our hands in the presence of two subscribing witnesses.

ROBERT A. GIBSON.
JOHN B. SARTOLOU.

Witnesses:
H. R. MATHERS,
A. L. VAN MATER.